United States Patent [19]

Russell

[11] 4,168,525

[45] Sep. 18, 1979

[54] UNIVERSAL TIMER

[76] Inventor: John H. Russell, 49 Sierra Way, West Yarmouth, Mass. 02673

[21] Appl. No.: 855,630

[22] Filed: Nov. 29, 1977

[51] Int. Cl.[2] .......................... G04F 7/06; G06F 7/00

[52] U.S. Cl. .......................................... 364/569; 58/74; 235/92 T; 307/293; 364/554; 364/705

[58] Field of Search ............... 364/554, 569, 705, 490, 364/507, 551; 235/92 T, 92 PD, 433; 328/69-72, 77, 95, 97, 137; 307/269, 293; 58/152 R, 24 R, 24 A, 74; 340/309.1

[56] References Cited

U.S. PATENT DOCUMENTS

| | | | |
|---|---|---|---|
| 3,656,060 | 4/1972 | Bauernfeind et al. | 235/92 T |
| 3,792,362 | 2/1974 | Grant | 328/72 |
| 3,889,103 | 6/1975 | Russell et al. | 235/433 |
| 3,955,355 | 5/1976 | Luce | 364/705 |
| 3,984,662 | 10/1976 | Sorenson | 235/92 T |
| 4,025,774 | 5/1977 | Johnson et al. | 364/569 |
| 4,027,470 | 6/1977 | Friedman | 235/92 T |
| 4,065,663 | 12/1977 | Edwards | 364/569 |

OTHER PUBLICATIONS

Belley et al., "Precision Timing Systems: Part I, Standard Scales," Instrument Systems; Sep. 1970, pp. 87-89.

*Primary Examiner*—Errol A. Krass

*Attorney, Agent, or Firm*—Sixbey, Friedman & Leedom

[57] ABSTRACT

A universal timer system with selectable time base and clock output is operable in several modes, including a plurality of timers interconnected in a sequentially mutually exclusive operation mode. In this mode, a succession of n number of events is counted using n number of timer units. The initial event is counted and timed on unit no. 1, the second on unit no. 2, etc., each unit operating to the mutual exclusion of all others. A group of three displays for each unit provides unique statistical information about each event which is useful to the time study engineer or statistician in computing values such as the number of observations necessary for a specific level of confidence, so that a real time determination of the required duration of study may be made.

39 Claims, 13 Drawing Figures

UNIVERSAL TIMER

FIELD OF INVENTION

This invention pertains generally to the field of digital elapsed time measurement systems having a capability of operating in different modes to furnish information of interest to the statistician, industrial engineer, or time study engineer such as the elapsed times during different occurrances which take place in succession during an operation under study.

BACKGROUND OF INVENTION PRIOR ART

A digital universal timer is known which is operable in several different modes or functions, including (1) start-stop with total elapsed time, (2) start-stop with accumulative event time, (3) split, (4) sequential with total elapsed time, (5) rally with total elapsed time, and others not relevant to this invention. Such a timer is embodied in a monolithic MOS integrated circuit available from National Semiconductor Corporation of Santa Clara, California and is identified by the alphanumeric designation MM5865.

In another timer, namely the Cronus Model M-D Dual Action Timer, simultaneous displays in Split (Σ) and Taylor (Δ) modes are provided.

It is further known to combine timers in a single package whereby a plurality of timers can be started simultaneously and subsequently operated individually in order to time two or more participants in a single study, such as competitors in a race. Each timer is capable of dual mode operation to provide indications of lap (elapsed) times and race (total) times for each participant. Such a system is disclosed in U.S. Pat. No. 3,889,103 issued June 10, 1975 to Lewis B. Russell and William F. Kelly.

Further, it is known in a data evaluation system to compute the sum of sigma squared of input data for purposes other than time study (Micka U.S. Pat. No. 3,908,118, issued Sept. 23, 1975).

Lastly, it has been recognized that the realiability of a particular statistical study may be determined by mathematical algorithms set forth in an article entitled "How Many Readings for a Time Study" by M. E. Mundel which appeared in "Modern Management" for August, 1949, at pages 21 and 22.

OBJECTS OF THE INVENTION

In contradistinction to the aforesaid prior art, it is among the objects of this invention to provide a statistical time study system including features by which 1. duplicate modular units are combined in a manner by which a single phenomena under study may be simultaneously counted in several timing modes,
2. the same units may be utilized to study several concurrently occurring events happening either simultaneously or randomly,
3. the accumulated totals of number of events, total study time, and elapsed time squared provides data requisite to computing mean or average time, standard deviation, and standard error without the need for intermediate read-out, posting and summing required in normal stopwatch operation,
4. the computation of the number of samples needed to attain a desired reliability in a study is facilitated by obviating the need for numerous initial computations relative to each event, and can be calculated at the study site prior to completion of the study,
5. the individual components are adaptable to assembly in a number of configurations customized to a particular application,
6. one basic circuit can be employed in a number of different physical configurations of casings and controls to fit particular usages, and
7. the system is operable in a sequentially mutually exclusive mode to study repetitive sequences of operations in a manner whereby the above-stated indications are maintained for each individual event.

DESCRIPTION OF THE DRAWINGS

An understanding of the circuits and structure by which the aforerecited, and other self-evident objective are attained may be understood by reference to the ensuing specification and to the accompanying drawings, in which.

DESCRIPTION OF THE INVENTION

The universal timer of this invention comprises a basic unit which is susceptible of incorporation in several different embodiments which suit various needs. In one embodiment, the basic unit is in modular form whereby several units may be stacked together with a multiple unit control which serves to synchronize operation of the basic modular units in a manner to be discussed later in this specification. The basic module provides three displays. A first display, identified as Counter A, displays the number of events which have been the subject of the study. The "events" counted in modes 1–4 are the number of elapsed time periods during which counting has taken place, whereas in mode 5 (Rally stopwatch or production monitoring) the "events" are occurrences such as number of laps, number of pieces produced, number of machine "ON" cycles, etc. A second display, identified as Counter B, operates in a number of modes in order to fulfill the demands of various study situations. In mode no. 1, Counter B operates in an intermittant fashion to provide standard start-stop timing, and to maintain a running total of the elapsed event time which has taken place in the study, i.e., since commencement of counting of the first event. In mode no. 2, operation is also intermittant to provide standard start-stop timing, but the total which is maintained is that of the accumulated times within elapsed times of each occurrence. In mode no. 3, operation becomes continuous. This is used in the timing of operations where an event commences immediately upon cessation of the previous event, as in laps in a race. Counter B provides timing of each individual sequential event and runs a total of the elapsed time in the study. Mode 4 is also continuous with the count of one event commencing at the value of the count of the preceeding event (standard split timing). Inasmuch as this is in itself a cumulative total, no separate running total is necessary. Finally, in mode 5, Counter B displays the total accumulated event times (Rally), and runs a total of the elapsed time in the study. In each instance (except mode 4) at the end of the study the display can be switched back and forth between the last individual event time which is normally displayed and the total value. Counter C is used throughout the timing modes 1–4 to calculate the square of the elapsed time values of Counter B. In the production monitor mode, Counter C is not used.

Figure 1A:
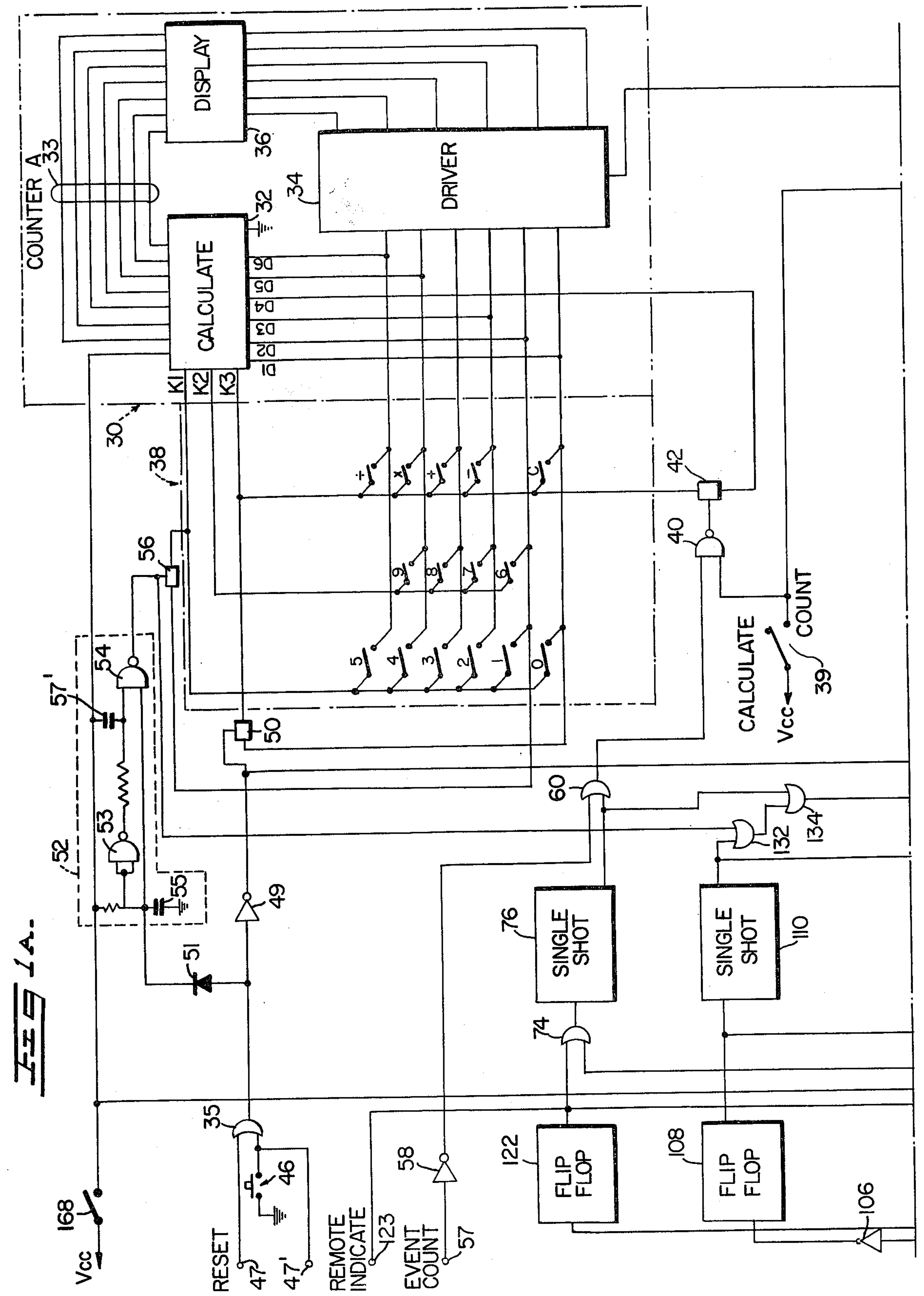
FIG. 1*a* is a schematic representation of a first portion of the circuitry of a basic timer unit of this invention.
Figure 1B:
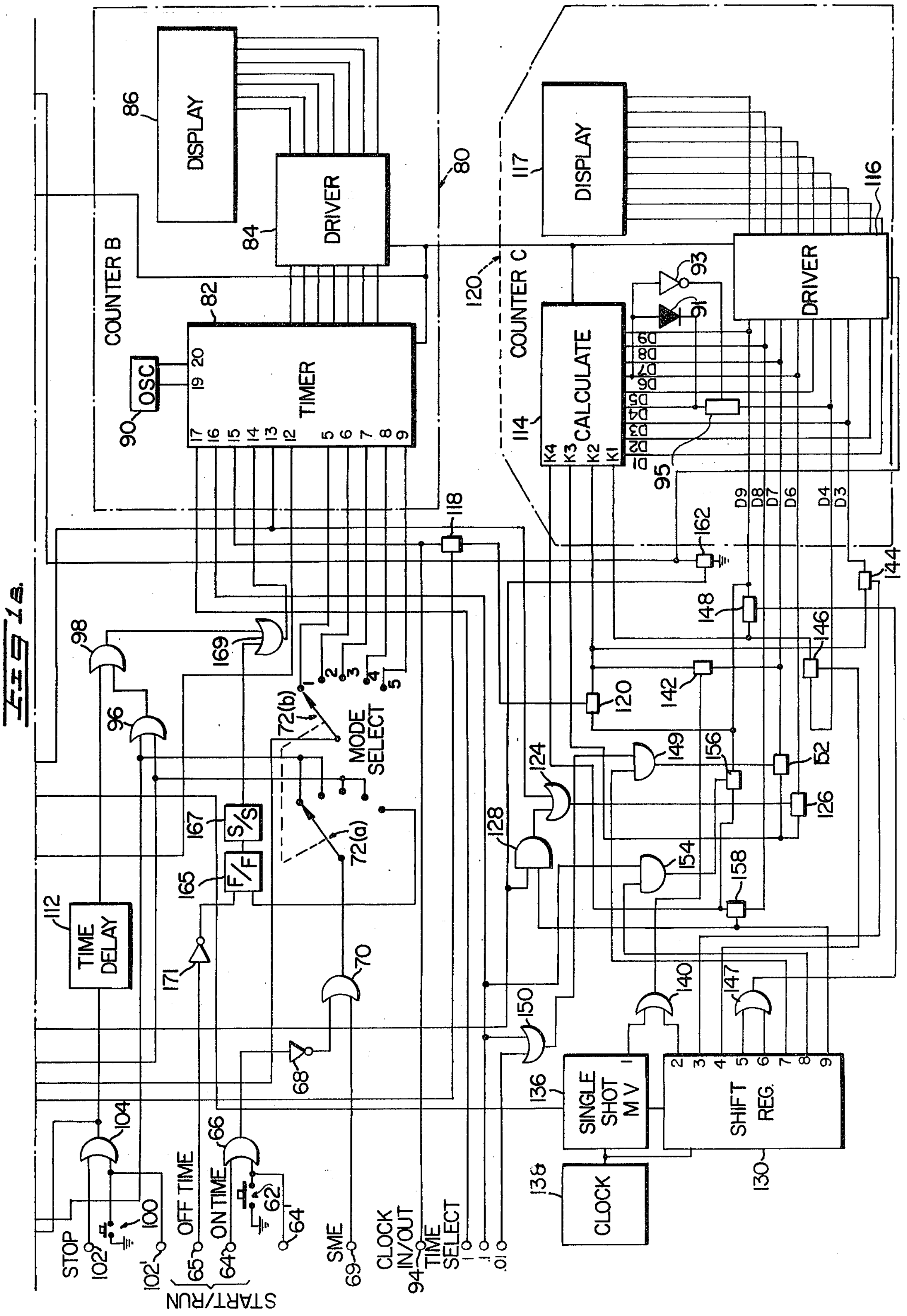
FIG. 1*b* is a schematic representation of the remaining portion of the circuitry of a basic timer unit.

The wiring of a single module is depicted schematically in FIG. 1. Each module is powered from a source Vcc through ON/OFF switch 168, and includes Counter A generally indicated at 30, Counter B generally indicated at 80, and Counter C generally indicated at 120. Inasmuch as Counter A includes the basic integrated circuitry for a calculator, it may be convenient to include a keyboard in one embodiment of the system, thus enabling the operator to utilize the module to make post-timing computations. This keyboard, generally indicated at 38 is, however, considered optional.

Considering first Counter A, this counter employs basic circuitry set forth in National Semiconductor Corporation publication entitled MOS/LSI Databook, section AN-112, at page 8–168. The circuit employs a National MM5736 calculator chip 32, a DM75492 digit driver 34, and a NSN66A LED display 36, all interconnected by circuitry which is conventional as diclosed in the aforementioned reference section AN-112. Specifically, the MM5736 is a 6 digit, no decimal point, five function calculator. The five functions are add, subtract, multiply, divide, and clear. The calculator has three inputs ($K_1$, $K_2$, $K_3$) that are designed to be driven by the Keyboard matrix and two sets of outputs, namely: six digit outputs ($D_1$---$D_6$) and seven segment outputs indicated at 33. The segment outputs 33 provide a positive true 7 segment code that represents the information in the calculator's display register. These outputs are multiplexed such that the 7 segment code for digit 1 appears on the segment outputs during digit time 1. The code for digit 2 appears during digit time 2 and so on. These outputs are designed to drive a LED readout in a digit multiplexed manner by strobing the LED characters with the digit outputs, which are buffered through driver 34.

Numbers are entered into the calculator by connecting the appropriate digit output $D_1$---$D_6$ to either the $K_1$ or $K_2$ input. Arithmetic operations (and a clear operation) are initiated by connecting the appropriate digit output to the $K_3$ input. The combinations of digit output and K inputs are set forth in the following table:

| Digit No. $K_1$ | $K_2$ | $K_3$ | |
|---|---|---|---|
| D1 | 0 | | CLR |
| D2 | 1 | 6 | |
| D3 | 2 | 7 | − |
| D4 | 3 | 8 | + |
| D5 | 4 | 9 | × |
| D6 | 5 | | ÷ |

When the optional keyboard is employed in a module of this invention, the connections to the individual keys are in accord with the foregoing table as evident in FIG. 1 A. Should it be considered desirable to include capability for computing square or square root, the National MM5791 calculator chip and keyboard illustrated at page 8–98 of the aforementioned Databook may be employed.

When the unit is employed as a conventional keyboard/calculator, selector switch 39 is positioned to open one input of AND gate 40, thus disabling gate 40 and holding switch 42 open. Moreover, Vcc to power Counters B&C is derived through switch 39. Consequently, the open condition of switch 39 serves to disable Counters B&C which are not used during operation of Counter A as a calculator. When the unit is employed as a counter, selector switch 39 is closed to apply Vcc to Counters B&C and to one input of AND gate 40, which is thus enabled to pass a pulse received at its other input. A pulse passed by AND gate 40 is effective to close bilateral switch 42 and connect the $D_4$ digit output to $K_3$ digit input, thus causing the calculator to perform an "add one" function. Each subsequent input pulse repeats the "add one" function, thus performing a count operation.

In studies involving continuous operation, a single event being counted may signify both the termination of one occurrence and the initiation of the next succeeding occurrence. To the end that the counter is self-starting, i.e., does not require a separate "START" operation to enter an initial 1 into the calculator 32, the circuitry indicated schematically above the keyboard is provided. With this circuitry, if reset push button 46 is depressed (or a negative reset impulse is received at RESET ALL terminal 47), the impulse is applied through OR gate 35 and inverter 49 to turn on bilateral switch 50, whereby output $D_1$ is connected to input $K_3$ to clear the calculator. At the same time, the impulse is applied through isolating diode 51 to a conventional time delay network 52 made up of two NAND gates 53, 54 and two capacitors 55, 57'. The impulse serves to discharge capacitors 55, 57'. When push button 46 is released (or the reset impulse is otherwise terminated), capacitors 55 and 57' will recharge, generating a delayed pulse on the gate of bilateral switch 56, connecting $D_2$ into $K_1$ to cause a one to be entered into the calculator. The delay is necessary to allow the CLEAR function to be debounced by the calculator chip in a conventional manner as disclosed in the National Semiconductor Databook.

In a similar fashion, when counter A is employed in a continuous counting operation in conjunction with counters B and C, yet to be described, and is to count the number of elapsed times measured by the other counters, the count input is derived from START/-STOP input push button 62 or remote start input terminal 64. Also, during multiple unit operation, a start pulse may be derived from the multiple unit control system through SME terminal 69. In either case, OR gate 66 passes the pulse through inverter 68 and OR gate 70 to mode selector switch bank 72*a*. In either continuous mode operation, i.e., contact positions 3 or 4, the selector switch routes the pulse through isolation OR gate 74 to single shot monostable multivibrator 76. The single pulse output is applied through "OR" gate 60 to the counter to update the counter in the aforedescribed manner. In intermittant modes 1 and 2, the START/STOP pulse is delivered to interval switch means comprising flip flop 122, which changes state and holds until a subsequent start pulse is received.

Turning to Counter B, the counter 80 employs a National Semiconductor Corporation MM5865 universal timer 82, with associated driver 84 and display 86, illustrated in somewhat abbreviated form in FIG. 1. A more detailed disclosure can be found in the aforementioned Databook at page 2-17 (FIG. 7), the details forming no part of this invention. As there set forth the universal timer employs two cascaded chips utilizing dual-in-line packaging. The counter package is operable in seven different modes, only five of which are utilized in this invention, namely:

| Mode | Input Pin at Logic 1 | Counter Chip | Function |
|---|---|---|---|
| 1 | 5 | 2 | Standard start-stop timing* |
| | | 1 | Total elapsed times |
| 2 | 6 | 2 | Standard start-stop timing* |
| | | 1 | Total accumulative event time |
| 3 | 7 | 2 | Sequential event timing* |
| | | 1 | Total elapsed time |
| 4 | 8 | 2 | Standard split timing* |
| | | 1 | (not used) |
| 5 | 9 | 2 | Rally (total accumulated times)* |
| | | 1 | Total elapsed time |

In each instance as indicated by the asterisk, the output of counter chip number 2 is normally displayed, whereas the content of counter chip number 1 is held in memory until called up for display in a manner dependent upon the setting of MODE SELECTOR switch 72 and yet to be described.

The time base for counter 82 maybe drawn from a local oscillator 90, the frequency of which is internally divided to attain a selected resolution in accordance with the code applied to resolution select terminals 16 and 17 of timer 82. Resolution select switch 88, which may be incorporated in each individual unit but preferably is located in the multiple unit control (see FIG. 5), is positioned by the operator to attain the desired resolution of units, tenths or hundredths in accordance with the following table:

| Resolution Select Switch | Resolution Select Input 16 | 17 | Oscillator Crystal Frequency | Clock Frequency Applied to Sub-Counters | Display Resolution |
|---|---|---|---|---|---|
| Hundreths | 0 | 0 | 32.8 k Hz | 100 Hz | 0.01 sec |
| " | 0 | 0 | 5.46667" | 16.6667" | 0.01 min |
| Tenths | 1 | 0 | 32.8" | 10" | 0.1 sec |
| " | 1 | 0 | 5.46667" | 1.6666" | 0.1 min |
| Units | 0 | 1 | 32.8" | 1" | 1 sec |
| " | 0 | 1 | 5.46667" | 0.1666" | 1 min |

-continued (logic 1=Vcc)
(logic 0=Vdd or floating)

The selected clock frequency is applied internally to both counter chips and is also present at clock input-/output terminal 15. This terminal is used as an output in this particular invention when oscillator 90 is employed, the output being routed through bilateral switch 118 to provide the selected time pulse to bilateral switch 120 for incrementing the time into Counter C. The clock input/output terminal 15 of timer 82 also connects to CLOCK OUTPUT terminal 94 where it may be utilized for clocking remote registers. The terminal may be used as an input when an external clock signal is applied at terminal 94.

Since Counter C is being fed at time pulse rates which include a rate as fast as 1/100 second, it is necessary to incorporate therein a speed-up circuit which is conventional and is described at page 8-170 of the aforementioned National Semiconductor Databook (1977). In this circuit, diode 91 feeds digit 6 output back to the digit 4 output, thus forcing $D_4$ high again during $D_6$ time. This fools internal logic in a manner which will double the effective counting rate of the calculator, but would have an adverse effect if allowed to reach the driver 116 and display 117. To prevent this, inverter 93 turns bilateral switch 95 OFF during $D_6$ time so that the extra pulse fed back to $D_4$ will not reach driver 116.

Timer 82 is readied for operation upon receipt of an input at its terminal 13. Such an input is created by depression and release of RESET button 46 or receipt of a RESET logic one signal at terminals 47, and serves to reset all logic and counters regardless of function setting.

Timing is initiated by application of a logic one (Vss) pulse to terminal 14, thus starting the internal clock of timer 82. Subsequent applications of a logic one pulse to this terminal affect counter 82 in different ways, depending upon the setting of mode selector switch 72. Specifically, when either START/STOP push button 62 is depressed or a START impulse is received at 64, OR gate 66 serves to pass an impulse through inverter 68, OR gate 70 and switch 72(*a*) in modes 1-4 to one or the other input of OR gate 96. Thus, OR gate 96 functions as isolation means for switch 72(*a*) outputs and regardless of the setting of MODE SELECTOR switch 72, OR gate 96 passes the start/stop impulse through OR gate 98 to terminal 14. However, the effect of receipt of this impulse at terminal 14 is determined internally of the counter by the logic state of terminals 5-9, which in turn is determined by the setting of MODE SELECTOR switch 72(*b*) in accordance with the following table:

| Mode | Input Pulse At Logic One* | Sequence | Function |
|---|---|---|---|
| 1 | 5 | 1st START/STOP Pulse | Chips 1&2 start counting, the count of chip 2 being displayed. |
| | | 2nd START/STOP Pulse | Clock pulses to chip 2 inhibited, contents of chip 2 are stored and displayed. Chip 1 continues to count. |
| | | 3rd START/STOP Pulse | Chip 2 is reset, clock pulses enabled and chip 2 restarts counting and is displayed. Chip 1 continues to count. |
| | | Subsequent START/STOP Pulse | Repeats above functions. |
| | | FINAL STOP Pulse | Inhibits clock pulses to both chips, chip 2 is displayed. |
| | | Subsequent START/STOP Pulse | Switch display between chip 1 and chip 2. |
| 2 | 6 | 1st START/STOP Pulse | Chips 1&2 start counting, the count of chip 2 being displayed. |
| | | 2nd START/STOP Pulse | Clock pulses to both chips are inhibited, contents of chip 2 are stored and displayed. |
| | | 3rd START/STOP Pulse | Chip 2 is reset, clock to both chips is enabled, chip 2 is displayed counting. |
| | | Subsequent START/STOP Pulse | Repeats above functions. |
| | | FINAL STOP Pulse | Inhibits clock pulses to both chips, chip 2 is displayed. |
| | | Subsequent START/STOP Pulse | Switch display between chip 1 and chip 2. |
| 3 | 7 | 1st Pulse | Chips 1&2 start counting, the count of chip 2 being displayed. |
| | | 2nd Pulse | Content of chip 2 is stored and displayed and chip 2 is reset and restarts counting, but new count is not displayed. Chip 1 continues to count. Count of Chip 2 remains displayed. |
| | | Subsequent Pulse | Repeats above function. |
| | | FINAL STOP (input 12) | Clock pulse to both chips inhibited, contents of chip 2 displayed. |
| | | START/STOP Pulse | Switches display from chip 2 to chip 1. |
| | | Subsequent Pulse | Switch display between chips 1&2. |
| 4 | 8 | 1st START/STOP Pulse | Chip 2 starts counting and is displayed. |
| | | 2nd START/STOP Pulse | Contents of chip 2 is stored and displayed. |
| | | Subsequent Pulse | Updates display of count in chip 2. |
| | | FINAL STOP Pulse | Clock pulses inhibited to both chips, count in chip 2 is displayed. |
| 5 | 9 | 1st START/STOP Pulse | Chips 1&2 start counting, chip 2 is displayed counting. |
| | | 2nd START/STOP Pulse | Clock pulses to chip 2 inhibited and count displayed, chip 1 continues counting. |
| | | 3rd START/STOP Pulse | Clock pulses to chip 2 enabled, chip 2 displayed counting. |
| | | FINAL STOP Pulse | Clock pulses inhibited to both chips, count in chip 2 is displayed. |
| | | START/STOP Pulse | Display switched from chip 2 to chip 1. |
| | | Subsequent Pulse | Display switched between chips 1&2 |

*Other input pins 5–9 are at logic 0.

Termination of all counting, regardless of the setting of MODE SELECT switch, is accomplished by closure of FINAL STOP switch 100 or reception of a transition (pulse) at STOP ALL input terminal 102, either of which is fed through OR gate 104 and inverter 106 to bistable stop switch means comprising Flip-Flop 108, which is ½ of a MM74C73 J-K Flip-flop. The positive pulse at the input causes Flip-flop 108 to change state, and this changed state is applied to the input of single shot 110, which is ½ of a MM74C123, a dual retriggerable monostable multivibrator or pulse generator. In response to a trigger, the output of 110 goes high, remaining high for a predetermined length of time and then returning to the initial state. This pulse of high output is applied to terminal 12 of timer 82, where it inhibits the clock pulses to both chips 1 and 2 and would display the contents of chip 2. However, the FINAL STOP pulse from OR gate 104 is also fed, through TIME DELAY network 112 (which may be identical to network 52) and OR gate 98 to the START/STOP input terminal 14 of timer 82. The function of network 112 is to slightly delay the transmission of the FINAL STOP pulse to timer 82 at input terminal 14, where it arrives shortly after receipt of the aforedescribed high output at terminal 12. Thus, the display is immediately switched from counter chip 2 to chip 1 to provide a display at 86 of the time of the final event. Subsequent activation of the START/STOP input 62 or 64 will switch the display between chip 1 (total accumulated time) and chip 2 (final event elapsed time) for mode 3, and depends upon mode.

Counter 120, labeled Counter C, comprises an MM5784 calculator 114, a DS8874 driver 116, and an NSA 1298 display 117, which units are available from National Semiconductors as calculator kit no. SK1075. The calculator 114 is a 5 function 9 digit accumulating memory circuit connected to compute the sum of the elapsed times squared. It is quite similar in internal make-up to the previously described calculator 32, except for its nine-digit capacity and additional memory functions. The unit 114 includes an entry register and an accumulator register (also working and memory registers). The number which is seen on display 117 can represent either the entry or the accumulator register contents. The content of the entry register is displayed during number entries, while the accumulator content is displayed after each function signal.

In substantially the same manner as described for calculator 32 of Counter A, calculator 114 performs arithmetical operations in response to appropriate connections between digit outputs and K inputs in accordance with the following truth table

| Digit No. | K4 | K3 | K2 | K1 |
|---|---|---|---|---|
| D2 | 7 | | | |
| D3 | 6 | | = | |
| D4 | 5 | | =+ | M+ |
| D5 | 4 | | =− | M− |
| D6 | 3 | MRC | ÷ | EXC |
| D7 | 2 | . | X | % |
| D8 | 1 | 9 | − | CS |
| D9 | 0 | 8 | + | C |

As incorporated in the universal timer of this invention, it is used primarily to calculate the sum of elapsed times squared. To this end, a clock signal is derived from terminal 15 of timer 82 and applied through time pulse switch means comprising bilateral switch 118 to the gate of bilateral switch 120. Bilateral switch 118 is turned on by flip-flop 122 during counting operations in all modes of operation except mode no. 5 in which mode Counter C is not used.

Figure 6:
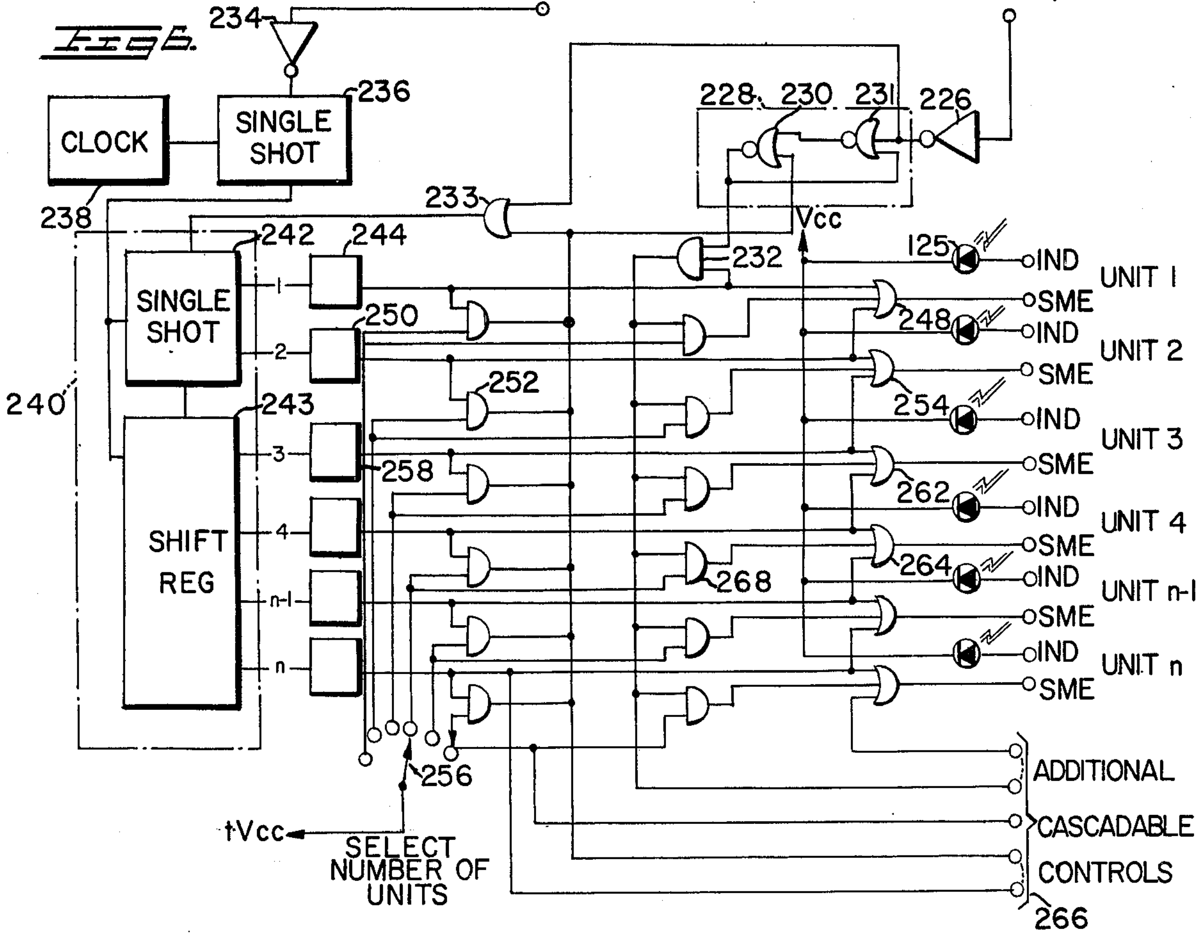
FIG. 6 is a schematic representation of the circuitry of a sequential mutually exclusive (SME) control of this invention.
Figure 11:
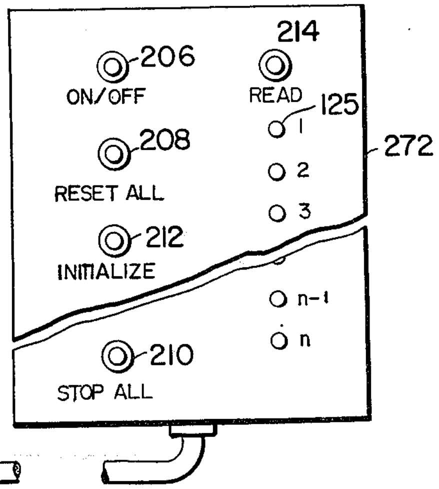
FIG. 11 is a remote unit for use with the system of FIG. 10.

Flip-flop 122 also serves to change the state at REMOTE INDICATOR terminal 123 and to activate a UNIT ON indicator 125 in the SME remote control box of FIGS. 6 and 11.

Assuming operation in one of modes 1-4, bilateral switch 118 is ON and clock pulses from timer 82 are fed to the gate of bilateral switch 120 when timer 82 is activated by a START input. Thus, each clock pulse serves to momentarily connect the K2 terminal of calculator 114 with the D9 input of driver 116, and in so doing performs a chain adding function by adding the value one to the entry register at each time increment as set by TIME SELECTION switch 88.

A RESET input, as at terminals 47, which is applied through the previously described path to terminal 13 of timer 82, is also applied through OR gate 124 to the gate of bilateral switch 126, thus connecting the K3 terminal of calculator 114 to the D6 terminal of driver 116 and functioning as a MEMORY RECALL command. Data in the memory register of calculator 114 is recalled and displayed at 117, and a second such signal will clear the memory to zero. This second signal is derived from terminal 9 of shift register 130, through AND gate 128, the output of which is applied to the other input of OR gate 124, but only when AND gate 128 has been enabled by a STOP signal applied to flip-flop 108, and when the sequencer 130 has run through triggering the requisite calculation steps in calculator 114, the sequence of which is now to be described.

The aforementioned activation of flip-flop 108 by a FINAL STOP signal is also effective to trip single shot 110, applying an output through OR gates 132, 134 to single-shot switch 136, which in turn initiates operation of sequencer 130. The sequencer 130 is clocked by an R-C clock 138 and functions in rapid sequence to trigger successive calculation steps on the part of calculator 114, to the end that display 117 will indicate the desired cumulative total. A momentary output at sequencer terminal 1 passes through OR gate 140 to turn on bilateral switch 142, thus connecting the D7 output of driver 116 with the K2 output of calculator 114, which calls for a multiplication function (×). It is the characteristic of the calculator that keying any function command serves to switch display 117 from the entry register to the accumulator register. Moreover, inasmuch as a terminate flag has not yet been set into calculator 114 (as by connection of K2 and D3), it is a further characteristic of the calculator that a second multiply command (×) will cause the number being displayed to be multiplied by the number residing in the working register. Because the number now being displayed is the accumulator, the result of a multiplication is the accumulator value is squared. Accordingly, advancement of the sequencer 130 to the next step wherein an output is provided at terminal 2 is effective again through OR gate 140 to activate gate 142, thus applying a second multiply function (×) to the calculator 114 and display the accumulated time squared.

Now that the elapsed time squared has been computed and displayed, the sequencer is effective upon advancement to an output at terminal 3 to activate bilateral switch 144, connecting driver terminal D3 to calculator terminal K2. This, which is the equivalent of an EQUAL/FUNCTION command (=), is effective to set the terminate flag in calculator 114. This signifies the end of a problem to the calculator.

As the sequencing cycle proceeds, an output appears at terminal 4 of sequencer 130, the activate bilateral switch 146, connecting terminal K1 of calculator 114 to terminal D4 of driver 116, thus producing a MEMORY PLUS command (M+) to the calculator. With this command, the number being displayed, which can be either the entry or accumulator quantity, will be added to the number in memory of the calculator. Hence, in the accumulator mode, the quantity being displayed (elapsed time squared) is added to the sum of elapsed times squared of previous events in the study and held in memory.

Sequencing continues, and terminals 5 and 6 receive consecutive outputs effective through OR gate 147 to turn bilateral switch 148 on and off twice in rapid sequence. This connects terminals K1 and D9 of the calculator 114 and driver 116 to create two successive CLEAR commands (C,C), thereby first clearing the entry and secondly clearing the accumulator and working registers, but not the memory register. The machine is thus placed in the constant add mode and the terminate flag is set.

So that the calculator may be readied for the next successive elapsed time measurement and calculation, certain preliminary functional commands must be transmitted to the calculator in order to set the decimal point in accordance with the particular timing rate which is being employed.

Accordingly, an output at terminal 7 of sequencer appears at one input of AND gate 149. If, and only if, the TIME SELECT switch 88 is set on either the 0.1 or 0.01 setting, a signal will be passed therefrom through OR gate 150 to the other input of AND gate 149, thus enabling the gate to pass the sequencer signal to bilateral switch 152. This connects terminal K3 of calculator 114 to terminal D7 of driver 116, which connection constitutes a SET DECIMAL POINT command (".") to the calculator. This command causes a decimal point to be entered to the right of the least significant digit (LSD), and signifies the start of a decimal point set sequence.

Now, if the TIME SELECT switch 88 is set in the 0.01 position, the next sequencer output (at terminal 8) will arrive and AND gate 154 and find it disabled because no signal is present at its other input. Thus, no command is transmitted to the calculator and the decimal point remains set to the right of the LSD. On the other hand, if TIME SELECT switch 88 is set at the 0.1 position, AND gate 154 is enabled, and the sequencer output is passed to bilateral switch 156, connecting terminal K4 of calculator 114 to terminal D9 which is effective to produce a SET ZERO command ("0") in the calculator 114. Inasmuch as the calculator is now in the decimal set condition, this command serves to shift the entry register left one position, thus setting the display for entering tenths of a unit, and the calculator assumes the number entry condition.

Finally, an output at terminal 9 of sequencer 130 turns on bilateral switch 158 to connect terminal K4 of calculator 114 to terminal D8 of driver 116 and create a SET ONE command (1). The entry register is again shifted one position to the left, and the value of one is entered into the LSD position. Simultaneously, the sequencer 130 output at terminal 9 is presented to one input of AND gate 128. If the output of flip-flop 108 is high, as when a stop signal has been received at its input, AND gate 128 passes the sequencer signal to OR gate 124 and to bilateral switch 126 to create a MEMORY RECALL COMMAND (MRC) at the termination of an elapsed time study. If flip-flop 108 is low, AND gate 128 is disabled, and the sequencer continues through another cycle as just set forth. The low output condition of flip-flop 108 is also effective to disable driver 34 and driver 116 through bilateral switch 162 and blank the respective displays 36 and 117.

Figure 12:
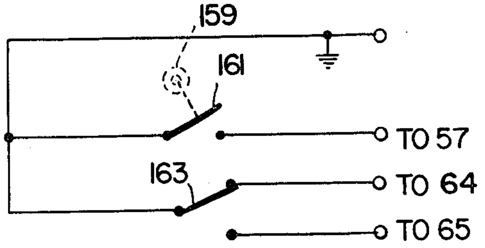
FIG. 12 is a schematic representation of a typical machine function sensor installation for use with production monitor of FIG. 7.

The foregoing description of operation of all counters has described operation in modes 1–4. In mode no. 5 (production monitoring), Counter A is often utilized to count occurrences such as a machine operation, number of items produced, etc., whereas Counter B is used to count the significant times expended in the occurrences, such as machine ON time and total study time. Counter C is not used. While such studies can be made by operator observation and control of the unit by the various control units yet to be described, a production monitoring study can be facilitated and its accuracy enhanced by having the monitor directly responsive to the machine. Such sensors are well known, and are indicated only schematically in FIG. 12. As indicated, a machine driven element 159 may be eccentrically connected to close a switch 161 on each occurrence of the event being counted, such as the stamping of a part by a punch press. Each closing of switch 161 serves to momentarily ground terminal 57 (FIG. 1) and provide an event count pulse to Counter A, thus advancing Counter A one increment in the manner previously described. Also associated with the machine is a switch 163, which may indicate machine ON or OFF condition, presence or absence of an operator, etc. The grounded output of this switch is applied to terminal 64 (FIG. 1) during ON (productive) times, and to terminal 65 during OFF (non-productive) times. Throughout the ON times, the grounded condition at terminal 64 is effective through gate 66, inverter 68, gate 70, and switch 72(*a*) to set flip-flop 165. The transition in state of flip-flop 165 triggers single shot multivibrator 167 to generate a pulse which is applied through OR gate 169 to terminal 14 of timer 82, thus initiating its counting operation. When switch 163 is returned to its OFF position, terminal 64 floats and terminal 65 is grounded, causing inverter 171 to reset flip-flop 165. The transition of state again generates a pulse at single shot 167 which is applied to terminal 14 of timer 82 to terminate counting of ON time. As in the case of Mode 1 operation, timer 82 continues internally to count total elapsed time until a final stop signal is applied to terminal 12, where a subsequent pulse will call up the total elapsed time to display 86.

Figure 2:
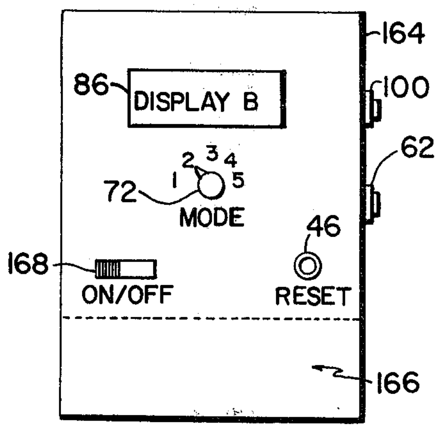
FIG. 2 is a plan view of the face of a simple stopwatch counter embodying the counter "B" of FIG. 1B.

Summarizing the operation of the single unit of FIG. 1 in its various modes of operation and in various configurations which may be constructed to apply all or only part of the aforedescribed circuitry, attention is invited to a simple single unit stop watch configuration which may be embodied in a hand held unit illustrated in FIG. 2. This unit comprises a casing 164 of a size which may be conveniently held in one hand. Power is derived from a battery compartment generally indicated at 166 through an ON/OFF switch 168. Display 86 has been described with respect to FIG. 1, as have the MODE SELECT switch 72, RESET button 46, START/STOP button 62 and FINAL STOP button 100. This unit may include a time select switch (not shown, see switch 88 in FIG. 5) or may be hand wired for a desired constant time base, thus eliminating the need for a TIME SELECT switch. The unit is arranged in a configuration which is convenient for one hand manipulation (start and stop actuated from the side of the case by the thumb of the operator) where only a stop watch operation is required. Normally the unit is held in the left hand of a right handed person and the operator would be using the index and middle fingers to operate switches 62 and 100 which are conveniently placed on the right side of the case 164. As previously described, the display 86 will provide an indication of elapsed time ($\Delta t$) while running, and an indication of total time $\Sigma\Delta t$ when reset. In use, an operator first selects the time base which provides the desired resolution by manipulation of switch 88 if present, and selects the desired mode of operation in accordance with the desired function as set forth in the table appearing in the preceeding discussion of operation of counter B. With power on, RESET button 46 is depressed to ready the unit for operation. All logic and counters are reset regardless of the setting mode switch 72. Counting is initiated by depression of START/STOP button 62, and display 86 provides a constantly updated indication of the elapsed time of the first event. Upon termination of the first event, the START/STOP button is again depressed to terminate counting of the first event. Other functions of this and subsequent repetitive depressions of the START/STOP button are dependent upon the setting of the mode switch as just indicated. Finally, upon completion of the study of all events, depression of the FINAL STOP switch 100 will discontinue counting and display the elapsed time $\Delta t$ of the final event, and a subsequent actuation of the START/STOP switch 62 will display the total accumulated time $\Sigma\Delta t$ of the events. The unit may then be reset for a subsequent study or depowered.

Figure 3:
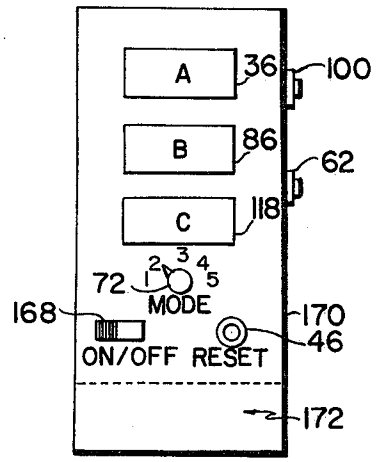
FIG. 3 is a plan view of the face of a single event accumulating event timer embodying the circuitry of FIG. 1.

Turning to FIG. 3, this unit is housed in a casing 170 which is also dimensioned to be conveniently hand held during use. As in FIG. 2, the unit includes a battery compartment 172, and ON/OFF switch 168, RESET button 46, START/STOP button 62, and FINAL STOP button 100. it differs from the embodiment of FIG. 2 in that it includes all three displays as described in FIG. 1, thus enabling it to be used as an accumulating event counter for a single event. Specifically, the unit provides for counters 30, 80 and 120 (labeled, respectively, counters A, B and C). This addition of counters A and C expands its capability to include an indication at display 36 of the count (N) and at display 118 of elapsed time squared ($\Delta t^2$) and the total of elapsed times squared ($\Sigma\Delta t^2$).

The operation differs somewhat depending upon whether a continuous operation (modes 3 or 4) is selected, or an intermittent operation (modes 1, 2 or 5) is selected.

Considering first a continuous operation, either mode 3 or 4 is selected by switch 72, power switch 168 is activated, and RESET button 46 is depressed to clear all displays and ready the unit for a study. Upon commencement of the first event of the study, START/STOP button 62 is depressed. The designation START/STOP is somewhat of a misnomer in this particular operation, for at the end of the first event when button 62 is again depressed, counting continues so that no time interval occurs between events, as in lap timing. Thus, button 62 is more properly termed a START/START button when in continuous mode operation. The activation of button 62 serves, through the operation of single shot 76 (FIG. 1) to update the count of Counter A (display 36) and the sequencing of Counter C (display 118) at the end of each event. Depression of button 62 is repeated at the end of each event to perform the start/start function until, at the end of the study, depression of FINAL STOP button 100 terminates counting. Indicators now display the respective data (i.e., N, $\Delta t$, and $\Delta t^2$) for the last event, and depression of the START/STOP button will now switch the displays to indicate data for the totals (i.e., $\Sigma\Delta t$, and $\Sigma\Delta t^2$). The unit may now be readied for another study by depression of RESET button 46 or its use terminated by depowering through switch 168.

Now considering operation of the same unit in the intermittent mode, either mode 1, 2 or 5 is selected, the unit powered and reset as before, and counting for the first event is commenced by depressing START/STOP switch 62. Counter B is started and display 86 indicates elapsed time, Counter A is incremented to indicate 1 event at display 36 and flip-flop 122 is activated to feed clock pulses to Counter C which displays elapsed time squared at display 118. At the end of the first event, another depression of button 62 stops Counter B and discontinues transmission of timing pulses to Counter C. Respective displays show elapsed time of the just completed event at 86 and elapsed time squared of the last completed event at 118. If operating in mode 2 Counter B continues to count total time, although it is not displayed at this point. If in modes 1 or 5, Counter B discontinues counting. Upon commencement of a subsequent event, button 62 is again depressed to reinitiate operation of all counters, and the cycle may be repeated for as many events as may be involved in the study. At the conclusion of the study, depression of FINAL STOP button 100 stops all counting, and a subsequent depression of the START/STOP button 62 switches display 86 to total elapsed times (mode 2). After readings are taken, the unit may be reset for another study for depowered.

Figure 4:
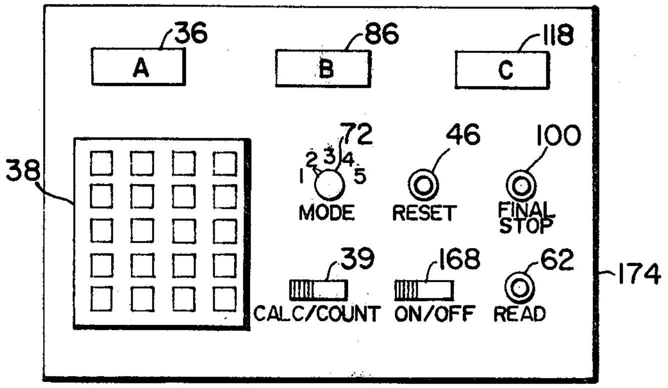
FIG. 4 is a plan view of a unit similar to FIG. 3 but including a keyboard.

Still another embodiment of a single unit is illustrated in FIG. 4. This unit is housed in a casing 174 dimensioned somewhat larger than those of FIGS. B and C, and includes a keyboard 38. The unit functions in the same manner is that of FIG. 3 when switch 39 is in the count position. When switch 39 is moved to the calculate position, display 36 and keyboard 38 may be used in the same manner as a conventional hand-held calculator, thus enabling the operator to make calculations on the data read out from a study without the necessity of employing additional equipment.

Figure 5:
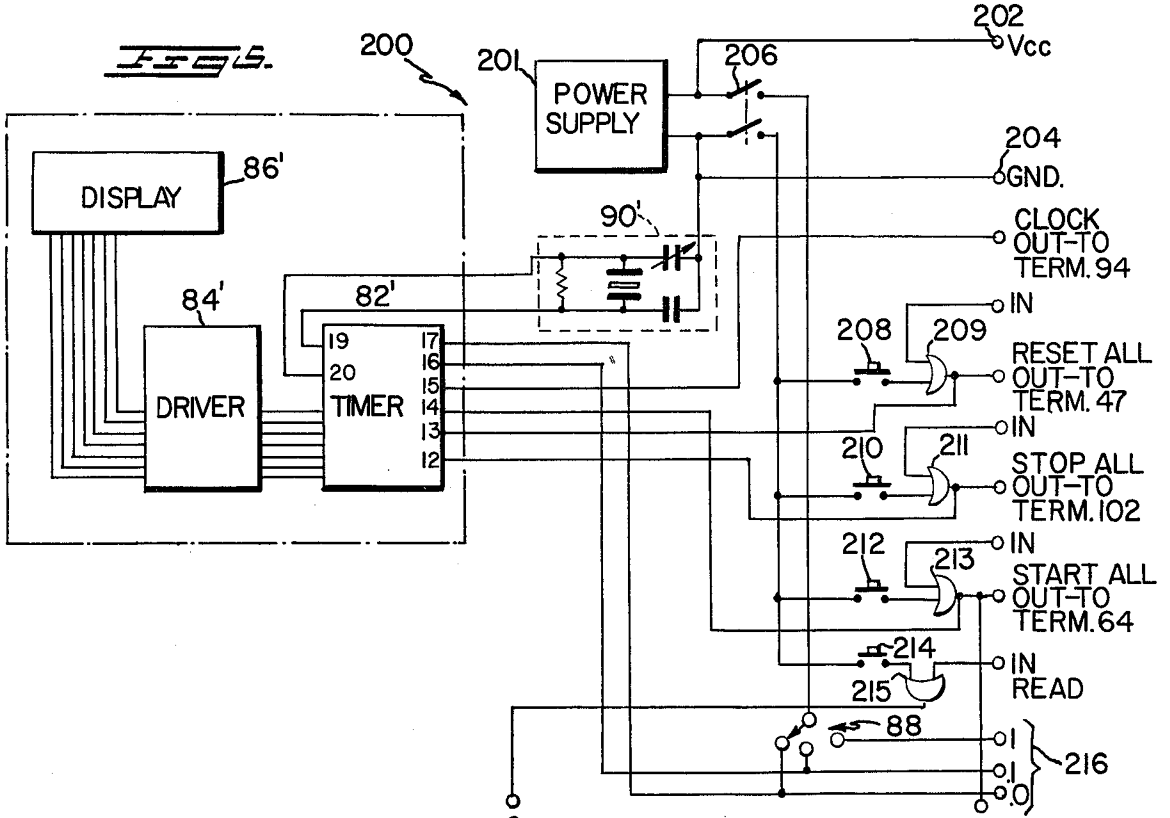
FIG. 5 is a schematic representation of the circuitry of a multiple unit control of this invention.

Thus far this specification has related to a single unit which enables an operator to conduct a single study involving successive events. However, the time study engineer is frequently confronted with the task of performing several studies simultaneously. To the end that the aforestated object may be attained, a preferred embodiment of this invention involves multiple unit control wiring as set forth in FIG. 5 and the physical configuration seen in FIGS. 8 and 10. Referring first to FIG. 5 the multiple unit control system indicated generally at 200 includes a display which is identical to Counter B of FIG. 1. Specifically, it includes a display 86', a driver 84', and a timer 82', all of which function in the same manner as previously described with respect to FIG. 1. The system further comprises a power supply 201 which may be a battery source or a rectifier connectable to an A. C. source (not shown) which, in either embodiment, supplies D. C. voltage Vcc to an output terminal 202 as well as ground return to terminal 204, from whence this voltage is distributed to the various units. With multiple unit ON/OFF switch 206 open, power is supplied for independent operation of each unit. When multiple unit control is desired, closure switch 206 supplies power (Vcc) to time select switch 88 and a ground path for control switches 208, 210, 212 and 214 function identically as do their counterparts in the individual units exemplified by FIG. 1 except that they act simultaneously on all units. Specifically, RESET switch 208 output is applied through terminal 47 to function as does switch 46, STOP switch 210 output is applied through terminal 102 to function as does switch 100, and START switch 212 output is applied through terminal 64 to function as does switch 62.

As thus far described, the multiple unit control system of FIG. 5 enables an operator positioned at the control system to control the starting, stopping, and reset functions of all units either individually or simultaneously, or any combination of individual control of selected units with simultaneous control of others. In some time study environments, it may become desireable for the operator to effect such control from a remote location. In order to fulfill this need, a remote control unit, to be described in connection with FIG. 9, may be utilized, and in order to provide for such unit, the multiple unit control system of FIG. 5 includes input terminals connected to OR gates 209, 211 and 113, respectively. Each input terminal is connectable to a corresponding switch in the remote control unit, and enables the corresponding button of the remote unit to duplicate the function of switches 208, 210, and 212. The circuitry involved in the remote unit is straight forward and a mere duplicate of that seen in FIG. 5 (i.e., a push button completing a circuit to ground) and hence is not shown.

Figure 8:
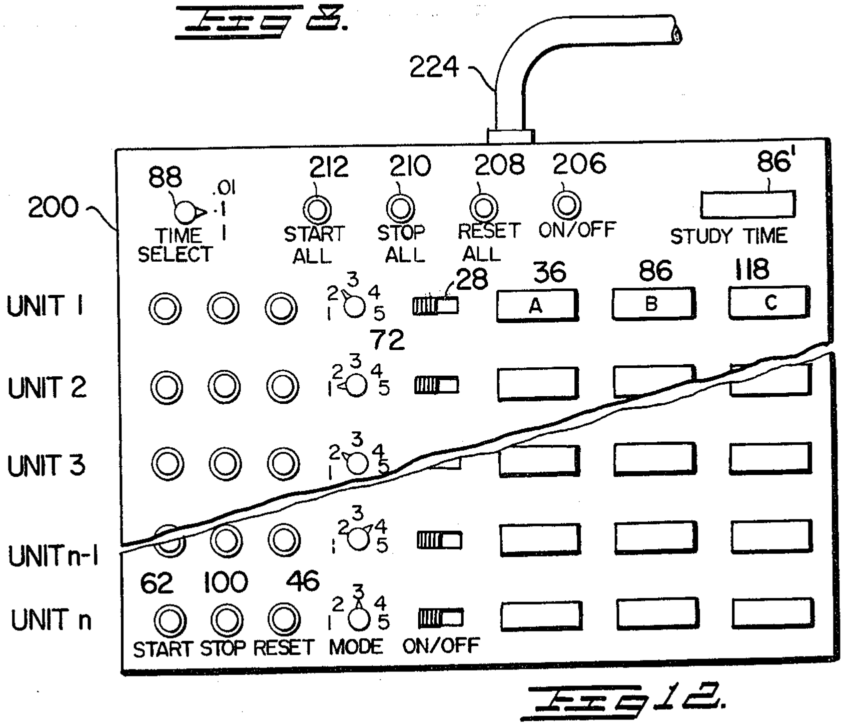
FIG. 8 is a plan view of the face of a multiple unit group event timer employing individual unit mode selection and controls.
Figure 9:
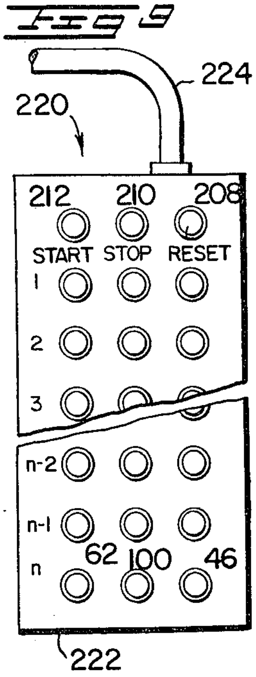
FIG. 9 is a remote control unit for use with the timer of FIG. 8.

An exemplary physical embodiment of the multiple unit control system is seen in FIG. 8, and its compatable remote control unit in FIG. 9. As there illustrated, multiple unit system comprises a stack of modular units 1–n of the type represented schematically in FIG. 1. The stack is topped by a multiple unit control 200 as represented schematically in FIG. 5. Interconnections are established as set forth in the discussion of FIG. 5, and operation is commenced by setting TIME SELECT switch 88 to the desired resolution value. If control is to be exercised over each unit independently, the ON/OFF switch 206 is left on, and each unit is operated separately in accordance with the aforedescribed manner of operation of the individual units. If, however, simultaneous operation of any two or more units in any one or more respect (start, stop, or reset), or if a count of overall study time is displayed at 86' is desired, ON/OFF switch is activated, thus enabling switches 208, 210 and 212 and TIME SELECT switch 88. Now, by use of the appropriate switch, all units may be started simultaneously, stopped simultaneously or reset simultaneously, while at the same time each unit is susceptable to individual control from the corresponding switches on the individual unit module. Moreover, should it be convenient for the operator to move about or to station himself at a position other than at the control unit of FIG. 8, a remote control unit such as is indicated at 220 (FIG. 9) may be employed. This unit comprises a casing 222 which supports a number of switches. These switches comprise several rows of RESET, STOP and START switches, the top row corresponding to switches 208, 210, and 212 of multiple unit control 200, and each other row corresponding in function to switches 46, 100, and 64 of its respective counter unit. An interconnecting cable carrier multiple conductors connecting the top row of switches to respective input terminals of OR gates 209, 211 and 213 (FIG. 5), and the other rows to the respective input terminals 47', 102' and 64' (FIG. 1) of the unit corresponding to each particular row of switches.

Figure 7:
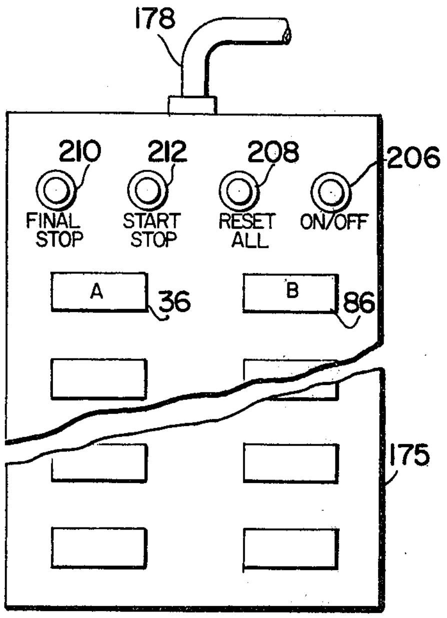
FIG. 7 is a plan view of the face of a multiple unit production monitor employing the circuitry of FIG. 1.

Another use for the multiple control system of FIG. 5 is in the field of production monitoring, and may be embodied in a unit as disclosed in FIG. 7. In production monitoring, each unit is set in mode 5. Moreover, counter C, which is not used in mode no. 5, is eliminated. Hence, casing 175 includes n number of rows, each having Counter A and Counter B only. Counter A displays a count of the units produced as determined by pulses received from appropriate transducers, such as a machine mounted sensors, at EVENT COUNT input terminal 57 of each respective unit. Counter B counts both total time and ON time, displaying the ON time, again in response to an appropriate machine sensitive transducer signal. Cable 178 carries interconnecting conductors between the machine sensors and the casing 175. ON time is normally displayed at display B of each unit, but a FINAL STOP signal followed by a START/STOP signal will switch the display to the total machine ON and OFF time in the manner described with respect to FIG. 1.

The multiple unit control as described thus far enables the user to simultaneously conduct several studies each of which involves a series of occurences occuring one after another, and to run cumulative totals of the time elapsed over the period of the series of occurences in the study. Thus, if the study involves occurrences "A", "B", "C" and "D", the cumulative totals become ΣΔ"A"+ΣΔ"B"+ΣΔ"C"+ΣΔ"D") for each of n number of studies. In time studies, however, it is frequently desireable to run a cumulative total of elapsed times for each particular event in a succession of studies, and to determine the number of successive studies necessary to attain a result having a specific level of reliability. In this case, the desired cumulative totals are Σn"A"; ΣΔt"A"; Σn"B"; ΣΔt"B"; Σn"C"; ΣΔt"C"; and Σn"D"; ΣΔt"D", etc.

Figure 10:
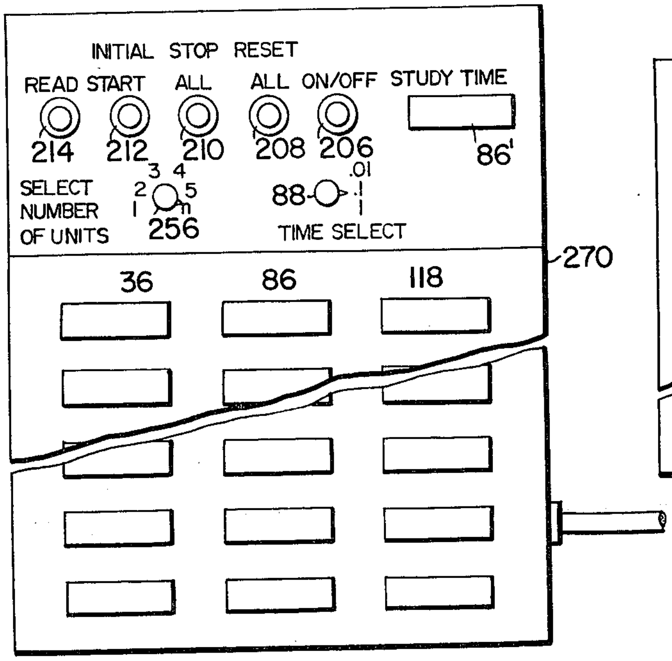
FIG. 10 is a multiple event time study system for sequential mutually exclusive operation.

To attain this end result, this invention provides a sequential mutually exclusive (SME) switching circuit schematically represented at FIG. 6, and shown in a preferred physical embodiment in FIGS. 10 and 11. Referring now to FIG. 6, operation of the SME is initiated by depression of START button 212 thereby creating a pulse which is transmitted through OR gate 213 and inverter 226 to one input of latch circuit 228. This latch circuit is a two input-inverting gate circuit of conventional construction and comprises two cross-coupled 74C02 NOR gates 230 and 231. Each remaining input drives its own gate output positive if it is briefly grounded. Thus, receipt of the inverted pulse at an input of NAND gate 231 drives its output positive and that of NAND gate 230 becomes zero. This zero condition holds AND gate 232 inhibited. Also, the initial START pulse from inverter 226 is passed through OR gate 233 to the input of single shot 242 to provide a pre-clear function and avoid the hazard of a disallowed state, i.e., the existence of two positive outputs at once due to a noise pulse or other spurious change of state within shift register 243. This serves to clear the register and place a one in the first stage of single shot 242, SME sequencer 240 now being in the state 100000. The ONE condition of the first output is passed by monostable multivibrator 244 to provide an input to OR gate 248. OR gate 248 is effective to pass a START pulse to terminal 69 of modular unit no. 1, thereby commencing its counting operation. For purposes of discussion, this first occurence which is now being counted is termed event "A".

Upon termination of event "A" and commencement of event "B", the operator depresses READ switch 214, or a comparable READ switch of a remote control as seen in FIG. 11. In either case, a pulse is produced at the output of OR gate 215 and is passed through inverter 234 to provide single shot 236 with a positive pulse. Single shot 236 is effective to provide one and only one pulse from clock 238, which inputs the sequencer 240 and advances it one step to state 010000. The sequencer 240 comprises a 74c74 single shot multivibrator 242 and a 74c164 shift register 243. As now advanced to the 010000 state, an output present at monostable multivibrator 250 is applied to three different inputs, namely an input of an end-of-sequence AND gate 252, an input of OR gate 248, and an input of OR gate 254. AND gate 252 is disabled by the absence of a signal at its other input, and remains in its "off" state. However, OR gates 248 and 254 are each effective to pass a positive pulse to terminals 69 of the respective modular units 1 and 2. Hence, counting for event "A" is terminated at unit number 1, which becomes idle. Simultaneously, Unit number 2 commences counting of event "B".

This sequence of operation is repeated for a given number of events in a particular study as set by appropriate positioning of NUMBER OF UNITS switch 256. Assuming a setting for four events as shown in FIG. 6, unit no. 3 counts event "C" in the same manner as described for unit 2. Upon termination of event "C" and commencement of event "D", sequencer 240 assumes the state 000100, providing a ONE state at the output of monostable multivibrator 258, again furnishing inputs at comparable positions, namely AND gate 260, OR gate 262, and OR gate 264. This being the terminal event of the study, AND gate 260 is enabled by the presence of a signal at its other input by virtue of the setting of switch 256. Thus, while OR gates 262 and 264 serve as before to terminate unit 3 counting of event "C" and commence unit 4 counting of event "D", a signal is also passed by AND gate 260 to latch circuit 228, causing it to change state and to reset the sequencer for the next cycle. Upon re-commencement of unit no. 1 counting of event A in the second study sequence, a pulse through AND gate 232 triggers the stop of unit number 4 through AND gate 268 and OR gate 264, it being noted that AND gate 268 is enabled by the presence of Vcc at its other input through switch 256.

Terminal group 266 is provided for cascading additional SME control units for studies involving more events, and is jumpered as indicated by dashed lines when a single unit is used.

The aforedescribed circuitry of FIGS. 5 and 6 finds implementation in a preferred embodiment illustrated in FIGS. 10 and 11. The control unit of FIG. 10, housed in casing 270, is similar to that of FIGS. 8 and 9, but adds the SELECT NUMBER OF UNITS switch 256 and includes both INITIAL START switch 212 and READ switch 214. Similarly, the remote control unit of FIG. 11, housed in casing 272, differs from that of FIG. 9 in the same regard.

In operation, the SME control, which functions in mode no. 2, is powered by energizing power supply 201, and a study is initiated at the start of the first occurence by depression of INITIAL START button 212. Counter 86' counts continually at its clock rate to provide an indication of the total elapsed study time, and unit no. 1 commences to count the time elapsed during event "A", the various values being displayed in row no. 1. Specifically, the first display (COUNTER A) is advanced one increment to indicate the first occurence of event "A", the second display (COUNTER B) continuously counts the time elapsed during event "A", ($\Delta t$"A") and the third display (Counter C) is of the continuously counted elapsed time of event "A" ($\Delta t$"A"). At the conclusion of event "A" and simultaneous commencement of event "B", the counting is shifted from unit 1 to unit 2 by depression of READ button 214. Counter C for event "A" is updated to ($\Delta t^2$"A") and reset. The operator may now record the readings $\Delta t$"A" and $\Delta t^2$"A" from unit number 1 while the count continues on unit 2 or on subsequent units. Unit 2 similarly displays n"B", $\Delta t$"B", and $\Delta t^2$"B" until the end of occurence B, whereupon READ button 214 is again depressed for advancement to unit 3, which counts occurence "C" while Counter C for unit 2 is updated to $\Delta t^2$"B" and reset. This sequence continues row by rwo until the unit designated by the setting of the NUMBER OF UNITS switch 256 is terminated, after which unit 1 commences counting of event "A" in a second sequence of operations, during which displays of n"A", $\Delta t$"A" and $\Delta t^2$"A" are presented. During these subsequent sequences, chip no. 1 of counter B continues counting of the cumulative totals of elapsed times for the occurence represented by each respective unit, but this quantity is not displayed. Moreover, Counter C, which had calculated the elapsed time squared for event "A", has held that value in memory. Upon completion of event "A" and advancement to unit 2, the presence of an SME pulse input at terminal 69 of unit 1 feeds a pulse through the MODE SELECT switch (set at mode 2) to function in the same manner as a START signal in the foregoing description of the detailed operation of Counter C. Thus, the elapsed time squared for event "A" (second sequence) ($\Delta t^2$"A") is added to that of event "A" (first sequence) ($\Delta t^2$"A") which had been held in memory to attain an updated sub-total of elapsed times squared ($\Sigma\Delta t^2$"A") for the number of "A" events. And the cycle is repeated for n number of events in the study. This quantity is still held in memory. At the conclusion of a study, a stop signal serves as before described as a MEMORY RECALL COMMAND to display $\Sigma\Delta t^2$.

Thus, the universal timer of this invention operates in the sequentially mutually exclusive mode to provide a unique combination of displayed values which are of particular value to the time study engineer in that it not only provides the data requisite to his ultimate computations, but facilitates error recognition and provides summation data at a point in computation, i.e., n, $\Sigma\Delta t$, and $\Sigma\Delta t^2$, which data facilitates a rapid determination of statistical significance for each event studied.

In the matter of error detection, the time study engineer need only determine from elapsed times recorded from display 86 at the end of each event which, if any, are abnormal in that they constitute a radical departure from an expected norm, and list those readings as errors. The number of errors listed is subtracted from the number of events displayed at 36 (N corrected), the total of erroneous elapsed times is subtracted from the quantity displayed at 86 at the conclusion of the study ($\Sigma\Delta t$ corrected), and the square of each elapsed time error is totaled and subtracted from the sum of all elapsed times squared as recorded from display 117 to obtain the quantity $\Sigma\Delta t^2$ corrected.

With the quantities thus corrected, the time study engineer may readily determine the reliability of the final average in a particular study by a procedure which is simplified from a procedure set forth in an article by M. E. Mundel entitled "How Many Readings for a Time Study" which appeared in *Modern Management*, August, 1949, at pages 21 and 22. In this article, the author sets forth formulae for determining probable accuracy of a study. These formulae require extensive computation of basic data, for instance:

Mundel Formula 1

$$s = \sqrt{\frac{\Sigma d^2}{N}}$$

where:

s=sigma or standard deviation
Σ=sum of all event values,
N=number of events,
d=T−M computed for each reading of the event separately before squaring and then summing,
T=individual readings of the event, and
M=the mean or average of all readings of an event.
Mean equals:

$$M = \Sigma T/N$$

The equation of formula 1 is expressed for machine computation as $$s = \sqrt{\frac{\Sigma T^2}{N} - \left(\frac{\Sigma T}{N}\right)^2} = \frac{1}{N}\sqrt{N\Sigma T^2 - (\Sigma T)^2}$$

Mundel solves for probability variability of the averages in groups of N values of T about the obtained M by his formula 2:

$$sM = \sqrt{s/N}$$

Mundel reasons that the property of the standard error of the mean is such that 95 percent of the probable values of M will lie within ±2sM of the true average. Hence, if 2sM is squal to or less than 5 percent of M, it may be said that the chances are at least 95 out of 100 that the average for the study is within 5 percent of the true average. If this condition is not met, Formula 2 may be worked backwards setting 2sM as 5 percent of M and solving for N' to determine the number of timings necessary to attain the desired 5 percent reliability.

Thus, combining formulas 1 and 2, Mundel states:

$$sM = \frac{\frac{1}{N}\sqrt{N\Sigma T^2 - (\Sigma T)^2}}{\sqrt{N'}}$$

and setting 5 percent of M equal to 2sM, $$0.05\,M = \Sigma T/20\,N$$

$$= 2\left(\frac{\frac{1}{N}\sqrt{N\Sigma T^2 - (\Sigma T)^2}}{\sqrt{N'}}\right)$$

AND $$\frac{\Sigma T}{20} = \frac{2\sqrt{N\Sigma T^2 - (\Sigma T)^2}}{\sqrt{N'}}$$

and arrives at Formula 3:

$$N' = \left(\frac{40\sqrt{N\Sigma T^2 - (\Sigma T)^2}}{\Sigma T}\right)^2$$

where:
N' is the required number of readings to attain a reliability level of 95 chances out 100 that the average for the study is within 5 percent of the true average.

In contradistinction to the initial computations requisite in the Mundel article, the accumulating event timer of this invention provides the time study engineer with basic information which simplifies computations of the number of timings requisite to attain a given level of reliability. By using only the expressions derived from the three displays of this invention as set forth, supra, namely n, $\Sigma\Delta t$ and $\Sigma\Delta t^2$, our computation becomes:

Mean or average $= \Sigma\Delta t/n$

Standard deviation, or sigma=

$$\sigma = \sqrt{\frac{\Sigma\Delta t^2}{n} - \left(\frac{\Sigma\Delta t}{n}\right)^2}$$

Standard Error of the Mean $= \sqrt{\sigma}/R$ and

The number of readings (R) for the chances to be 95 out of 100 that the average for the study is within ± 5 percent of the true average representing the events studied is expressed, $$R\,(5\%) = \left(\frac{40\sqrt{(n \times \Sigma\Delta t^2) - (\Sigma\Delta t)^2}}{\Sigma\Delta t}\right)^2$$

Thus, it can be seen that the accumulating event timer of this invention provides values which obviate the need for such complex preliminary computations as determining the mean for all event values and subtracting the mean from each individual value before squaring and summing, and thus facilitates time study computations.

In compliance with the requirements of the patent statutes, this specification has specifically and concisely set forth the best mode of embodiment of this invention, it being understood that the particular embodiment is set forth in the sense of explanation rather than limitation. Hence, the scope of this invention is not limited to the particular embodiment, but should be construed in accordance with the following claims:

I claim:

1. A universal timer unit comprising the combination of counting means including an input for receiving recurring signals indicative of the occurrences of individual events, means for counting said recurring signals, and count registering means for registering a value representative of the number of such occurrences timing means including a start/stop input for receiving signals indicative of the duration of events, and a first register means for registering a value representative of said elapsed time of each said event, calculating means synchronized with said timing means for continuously computing the value of the square of said elapsed time values, said calculating means including time squared registering means for registering the sum of the squared values of the elapsed times, and first display means, second display means, and third display means connected, respectively, to said counting means, said timing means, and said calculating means for simultaneously displaying each respective one of said registered values.

2. A universal timer as set forth in claim 1 wherein said counting means input receives signals from an event count circuit and an elapsed time start/stop circuit, and said means for counting recurring signals is responsive to receipt of recurring signals on either said event counter circuit or said stop/start circuit.

3. A universal timer as set forth in claim 2 wherein said start/stop input is connected to said elapsed time start/stop circuit.

4. A universal timer as set forth in claim 3 wherein said calculating means includes an input connected to said elapsed time start/stop circuit.

5. A universal timer as set forth in claim 4 and wherein said timing means includes a final stop input, the improvement comprising a final stop circuit means connected to said timing means and said calculating means for stopping operation of said timing means and said calculating means.

6. A universal timer as set forth in claim 5 and wherein said timing means includes a second register means for registering the total of elapsed times of the events and is of the type wherein a signal applied to said start/stop input after a signal has been applied to said final input is effective to shift said respective display from said count registering means to said second register means, the improvement comprising a time delay circuit interconnecting said final stop circuit means and said start/stop input of said timing means, whereby a signal applied to said final stop circuit means is applied to said final stop input of said timing means, and a delayed signal is subsequently applied to said start/stop input of said timing means.

7. A universal timer unit as set forth in claim 5 wherein said first and third display means connected to said counting unit and said calculating unit, respectively, are of the type including means for blanking the respective display means, the improvement comprising display control switch means for controlling said blanking means, and means interconnecting the output of said final stop circuit and said display control switch means.

8. A universal timer unit as set forth in claim 2 wherein said elapsed time start/stop circuit includes manually settable switch means for selecting operating modes, said switch means having an input for receiving a start/stop signal, a first output for intermittent timing mode operation and a second output for continuous mode operation, said manually settable switch means including a switch element movable among plural positions in which said input is connected to one of said first and second outputs and isolation means connecting both said outputs to said timing means start/stop input.

9. A universal timer unit as set forth in claim 8 wherein said first output is connected to bistable interval switching means having a bistable output, said bistable interval switching means being responsive to start/stop signals to provide a signal in one state on said bistable output during a timed occurrence and a signal in another state on said bistable output during intervals between timed occurrences.

10. A universal timer unit as set forth in claim 9 including a remote indicator output terminal connected to the output of said interval switching means.

11. A universal timer unit as set forth in claim 9 wherein said timing means is of the type which includes a clock output terminal and said calculating means is of the type including an input register for recording a number to be operated upon and an =+ input for causing said calculating means to add 1 to the value recorded in said input register, the improvement comprising time pulse switch means interconnecting said clock output terminal and said =+ input, and means interconnecting said bistable output of said interval switching means with said time pulse switch means to control said time pulse switch means to pass clock output signals to said =+ input during the timed event to perform a chain adding function.

12. A universal timer unit as set forth in claim 9 including isolation gate means having one input connected to the output of said interval switching means and another input connected to said second output of said manually settable switch means, said isolation gate means having an output connected to said counting means input and to said calculating means.

13. A universal timer unit as set forth in claim 12 including a monostable switching element in the output of said isolation gate means leading to said counting means and to said calculating means.

14. A universal timer unit as set forth in claim 13 including an event count input means and means coupling said event count means to the output of said monostable switching element for unidirectional transmission of event count signals to said counting means.

15. A universal timer unit as set forth in claim 7 wherein said timing means includes a production monitoring terminal means for causing said timing means to operate in a production monitoring mode in to said timing means operates to time individual events and to calculate the sum of the elapsed times of all events, and wherein said manually settable switch means includes a monitor output connected to said production monitoring terminal means, said switch element being movable to a position in which said input of said manually settable switch means is connected to said monitor output for operating said timing means in a production monitoring mode, bistable switching means having first and second inputs, said first input being connected to said monitor output, and wherein said elapsed time start/stop circuit includes a machine off time input for receiving signals indicative of the discontinuance of an event, said second input of said bistable switching means being connected to said machine time off input whereby a start/stop signal at said input of said manually settable switch means sets said bistable switching means in one output state and a signal at said machine off time input switches said bistable switching means to its alternative output state, and means connecting said bistable switching means output to said elapsed time start/stop input of said counting means.

16. A universal timer unit as set forth in claim 1, said unit including a reset input circuit means for resetting said register means of said counting, timing and calculating means, a final stop input circuit means for stopping operation of said counting, timing and calculating means, a start/stop input circuit means for commencing and stopping event timing of said timing means, and a ground return circuit, each said input circuit means comprising an OR gate having first and second inputs, two input terminals and one manually operable switch, one said input terminal being connected to said first input of said OR gate, the other said input terminal being connected to said second input of said OR gate, and said manually operable switch being connected between said first input of said OR gate and said ground return circuit.

17. A universal timer as defined in claim 16, wherein said reset input means includes a delay circuit means for causing a one to be entered in said count registering means of said counting means.

18. A universal timer unit, comprising (a) a timer means for measuring the elapsed time of plural events, said timer means including
  (1) start/stop means for starting and stopping a time measurement by said timer means, said start/stop means including a stop/start input,
  (2) a clock output for supplying timing signal during operation of said timer means, and
  (3) a timer display means for displaying elapsed time;

(b) calculator means having digit output conductors and key entry conductors which may be selectively connected to cause any one of a plurality of mathematical operations by said calculator means including a chain adding function in which the number 1 is added to a sum previously calculated by said calculator means, said calculating means including a calculating means display for displaying the results of a mathematical operation by said calculating means;

(c) controllable switching means interconnecting certain of said digit output conductors with certain of said key entry conductors for causing said calculator means to perform said mathematical operations as desired, said controllable switching means including plural controllable switches;

(d) sequencer means comprising a shift register including a plurality of outputs;

(e) interconnecting means for interconnecting said sequencer outputs with said controllable switches, respectively;

(f) start/stop means for supplying recurring signals indicative of the start and stop of said events to said timer means and to said sequencer means; and (g) controllable time pulse switch means connected between said clock output of said timer means and one of said controllable switches for passing timing signals during each said event said one controllable switch being connected to one of said digit output conductors and one of said key input conductors to cause said calculating means to perform the chain add function in response to the receipt of timing signals from said clock output, whereby said chain add function is slaved to said timing signals of said timer means.

19. A universal timer unit as set forth in claim 18, wherein said interconnecting means includes plural OR gates, each said OR gate having a pair of inputs and a single output and wherein said plurality of outputs of said sequencer means include some pairs of successive outputs, each said pair of successive outputs being connected to respective inputs of one said OR gate, whereby operation of said sequencer means provides a pair of successive signals on said OR gate outputs.

20. A universal timer unit as set forth in claim 19 wherein said interconnecting means is connected so as to cause successive interconnection of selected digit output conductors with selected key input conductors in a sequence to cause said calculator means to perform sequentially the mathematical operations defined by the functional commands ×, ×, =, M+, C, C.

21. A universal timer unit as set forth in claim 20 including a final stop signal circuit,
blanking means connected to said calculating means display,
bistable stop switch means interconnecting said final stop circuit with said blanking means, and
means including a pulse generator interconnecting said bistable stop switch means with said timer means, whereby
a signal at said final stop circuit is effective to terminate elapsed time counting, commence calculation of the value of the square of the elapsed time, the unblank said calculating means display.

22. A universal timer unit as set forth in claim 20 including time select inputs, means interconnecting said time select inputs with said timer means to cause said timer means to measure time in a desired unit of time, enabling switch means connected between said time select inputs and said interconnecting means to cause said controllable switch means to interconnect those digit output conductors and key entry conductors which are required to permit said calculating means to calculate using the unit of time in which the time was measured by said timer means.

23. A control unit for controlling a plurality of universal timer units, each said universal timer unit including a reset input means for preparing the respective said universal timer to perform a timing operation, a final stop input means for causing the respective timer unit to cease all timing operations, and a start/stop input means for causing the respective said timer unit to commence and to stop a timing operation upon receipt of signals by said start/stop input means; said control unit comprising a reset control means for controlling simultaneously the operation of said reset input means of all said universal timer units including a first OR gate having first and second inputs and an output, said output being connected to said reset input means of all said universal timer units and including a first manually controllable switch connected to said first input of said first OR gate;

final stop control means for controlling simultaneously the operation of said final stop input means of all said universal timer units, said final stop control means including a second OR gate having first and second inputs and an output connected to said final stop input means of all said universal timer units and including a second manually controllable switch connected to said first input to said second OR gate; and start/stop control means for controlling simultaneously the operation of said start/stop input means of all said universal timer units, said start/stop control means including a third OR gate having first and second inputs and an output connected to said start/stop input means of all said universal timer units and including a third manually controllable switch connected to said first input of said third OR gate.

24. A control unit for controlling a plurality of universal timer units as set forth in claim 23, further including a control unit timer having reset, final stop and start/stop function inputs, and means connecting the output of said first, second and third OR gates to the corresponding function input of said control unit timer.

25. A control unit for controlling a plurality of universal timer units as set forth in claim 24 wherein said control unit timer includes a clock output and each one of said plurality of universal timer units includes a clock input, and means interconnecting said clock output and the said clock inputs of each said universal timer unit.

26. A control unit for controlling a plurality of universal timer units as set forth in claim 23 wherein each said universal timer unit includes a plurality of time select inputs, said control unit including a manually settable time select switch having plural outputs connected to the time select inputs of each said universal timer unit.

27. A control unit for controlling a plurality of universal timer units as set forth in claim 23 further including a remote control unit having a plurality of remote control outputs connected, respectively, to the second input of each said OR gate of said control means, a plurality of remote control manually operated switches connected, respectively, to said remote control outputs, whereby the reset, final stop and start/stop function of each timer unit may be manually controlled from said remote control unit.

28. A sequential mutually exclusive control circuit for sequentially operating in a predetermined order a plurality of timers with each timer including a start/stop input and a start/stop circuit connected to said start/stop input for timing of an event by measuring the elapsed times between receipt of signals on said start/stop input, said sequentially mutually exclusive control circuit comprising a start input circuit, an SME sequencer having a control input and a plurality of outputs on which an output signal appears sequentially, a plurality of unit SME outputs connected to said start/stop inputs to said timers, respectively, and gating means interconnecting each said SME sequencer output with its corresponding unit SME output and with the unit SME output next preceeding said corresponding SME output in the order in which said timers are to be operated, whereby the presence of a signal at an SME sequencer output is effective to initiate counting in a connected timer unit and to terminate counting in a unit preceeding said connected timer.

29. A sequential mutually exclusive control as set forth in claim 28 including selecting switch means for selecting the number of said timing units to be subject to sequential mutually exclusive control, a plurality of end-of-sequence AND gates each having first and second inputs and an output, said first inputs being connected to respective SME sequencer outputs said selecting switch means having a plurality of outputs connected to said second inputs of said end-of-sequence AND gates, respectively, and said outputs of said end-of-sequence AND gates being connected to said SME sequencer start input, whereby when said SME sequencer advances to the value of the setting of said switch means, the associated end-of-sequence gate resets and reinitiates operation of said SME sequencer.

30. A sequentially mutually exclusive control for a plurality of timers as set forth in claim 29 including n number of said SME outputs and additional terminals for cascading additional SME controls, said switch means including terminals connected, respectively, to said SME sequencer start input, the nth sequencer output, and the said enabling input of the nth end-of-sequence AND gate.

31. A sequential mutually exclusive control for a plurality of timers as set forth in claim 28 including n number of said SME outputs and additional terminals for cascading additional SME controls, said additional terminals including a terminal connectable to the first SME sequencer output of a cascade unit, said terminal connected to the gating means for the nth SME output.

32. A multi-modal universal timer apparatus operable in different modes to obtain timing information regarding plural events which may occur at successive intervals or at intermittent intervals of time, comprising (a) event sensing means for sensing the occurrence of an event and for forming a signal representing the occurrence and the elapsed time of the event;

(b) event counting means for counting the number of events sensed by said event sensing means and for storing a signal representative of said number;

(c) multi-modal event timing means for measuring the elapsed time during which each event occurs and for measuring, computing and storing additional timing information regarding the timed events dependent upon the mode of operation selected from a plurality of possible operating modes including a first mode in which the sum of elapsed time for intermittently occurring events is computed and stored and the total elapsed time from the commencement of the first event until the termination of the last event is measured and stored and including a second mode in which the sum of elapsed time for intermittently occurring events is computed and stored and including a third mode in which the sum of elapsed time for successively occurring events is computed and stored;

(d) calculating means for responding to control signals to enter a number and to perform a sequence of mathematical operations on the entered number wherein the timing of said mathematical operation may be varied in dependence upon the timing of the control signals received by said calculating means; and (e) universal timer control means connected with said event sensing means, said event counting means, said multi-model event timing means and said calculating means for selecting the mode of operation of said multi-modal event timing means and for producing varying control signals for causing said calculating means to enter said elapsed time measurements of said multi-modal timing means and to perform the desired mathematical operations thereon in timed sequence with the occurrence of the sensed events, whereby the operation of said calculating means may be slaved to the operation of said multi-modal timing means.

33. Timer apparatus as defined in claim 32 further including display means for displaying the information recorded by said event counting means, by said multi-modal event timing means and by said calculating means, said display means including first, second and third displays connected with said event counting means, said multi-modal event timing means and said calculating means to permit the information stored therein to be displayed simultaneously.

34. Timer apparatus as defined in claim 32, wherein said multi-modal event timing means may be operated in a fourth mode in which the timing of each event commences with the number stored as a result of the timing of the previous event.

35. Timer apparatus as defined in claim 32, wherein said universal timer control means includes a manually settable switch means for selecting the operating mode of said multi-modal timing means, said manually settable switch means having an input for receiving a signal from said event sensing means, a first output for use in timing intermittent events while operating said multi-modal event timing means in said first and second modes and a second output for use in timing events while operating said multi-modal event timing means in said third mode, said settable switch means including a switch element movable among plural positions in which said input of said settable switch means is connected to one of said first and second outputs and isolation means for connecting both said outputs of said settable switch means to said multi-modal timing means.

36. Timer apparatus as defined in claim 35 wherein said universal timer control means includes a bistable interval switching means having a bistable output, said first output of said manually settable switch means being connected to said bistable interval switching means and said bistable interval switching means being responsive to start/stop signals from said event sensing means to provide a signal in one state on said bistable output during a timed occurrence and a signal in another state on said bistable output during intervals between timed occurrences.

37. Timer apparatus as defined in claim 36 wherein said multi-modal timing means includes a clock output terminal and said calculating means includes an input register for recording a number to be operated upon and an =+ input for causing said calculating means to add 1 to the value recorded in said input register, and wherein said universal timer control means includes a time pulse switch means interconnecting said clock output terminal and said =+ input, and means interconnecting said bistable output of said interval switching means with said time pulse switch means to control said time pulse switch means to pass clock output signals to said =+ input during the timed event.

38. Timer apparatus as defined in claim 37 wherein said multi-modal timing means includes a production monitoring terminal means which upon receipt of a signal causes said multi-modal timing means to operate in a fifth mode in which said timing means operates to time individual events and to calculate the sum of the elapsed times of all events, wherein said manually settable switch means includes a monitor output connected with said production monitoring terminal means, said switch element being movable to a position in which said input of said manually settable switch means is connected to said monitor output for operating said multi-modal timing means in a production monitoring mode, bistable switching means having first and second inputs, said first input being connected to said monitor output, and wherein said event sensing means includes a machine off time input for receiving signals indicative of the discontinuance of an event, said second input of said bistable switching means being connected to said machine time off input whereby a signal at said input of said manually settable switch means sets said bistable switching means in one output state and a signal at said machine off time input switches said bistable switching means to its alternative output state, and means connecting said bistable switching means output to said multi-modal event timing means.

39. Timer apparatus as defined in claim 36, wherein said calculating means includes a multiplier circuit and an adder circuit for calculating the square of the value of each elapsed time measured by said multi-modal timing means and for computing and storing the sum of all said squared values computed.

* * * * *